(12) United States Patent
Chalmers et al.

(10) Patent No.: US 12,229,470 B2
(45) Date of Patent: *Feb. 18, 2025

(54) SYSTEM AND METHOD FOR PAIRING A HEARING DEVICE AND AN APPLIANCE

(71) Applicant: Universal Electronics Inc., Santa Ana, CA (US)

(72) Inventors: Peter William Chalmers, Tustin, CA (US); Jon Gallegos, Huntington Beach, CA (US); Jeff Kohanek, Huntington Beach, CA (US); Kenneth G. Sweeney, Oceanside, CA (US)

(73) Assignee: Universal Electronics Inc., Santa Ana, CA (US)

( * ) Notice: Subject to any disclaimer, the term of this patent is extended or adjusted under 35 U.S.C. 154(b) by 240 days.

This patent is subject to a terminal disclaimer.

(21) Appl. No.: 17/019,574

(22) Filed: Sep. 14, 2020

(65) Prior Publication Data

US 2020/0409649 A1 Dec. 31, 2020

Related U.S. Application Data

(63) Continuation of application No. 15/091,714, filed on Apr. 6, 2016, now Pat. No. 10,853,021.

(51) Int. Cl.
*H04R 1/10* (2006.01)
*G06F 3/16* (2006.01)
*H04B 7/26* (2006.01)
*H04W 4/60* (2018.01)

(52) U.S. Cl.
CPC ............. *G06F 3/162* (2013.01); *G06F 3/165* (2013.01); *H04B 7/26* (2013.01); *H04R 1/1041* (2013.01); *H04R 2227/005* (2013.01); *H04R 2420/07* (2013.01); *H04R 2460/07* (2013.01); *H04W 4/60* (2018.02)

(58) Field of Classification Search
CPC .... H04R 25/55; H04R 25/554; H04R 25/558; H04R 2420/07; H04R 2460/07
USPC ............................................ 381/81, 74, 315
See application file for complete search history.

(56) References Cited

U.S. PATENT DOCUMENTS

| 8,073,137 | B2 | 12/2011 | Weinans et al. |
| 9,301,087 | B1* | 3/2016 | Pappas ................. H04W 76/36 |
| 2004/0185773 | A1 | 9/2004 | Gerber et al. |
| 2005/0044410 | A1 | 2/2005 | Yan |
| 2007/0255435 | A1 | 11/2007 | Cohen et al. |
| 2008/0113689 | A1 | 5/2008 | Bailey |

(Continued)

OTHER PUBLICATIONS

EPO, examination report issued on European patent application No. 17779522.6, dated Dec. 3, 2020, 5 pages.

(Continued)

*Primary Examiner* — Katherine A Faley
(74) *Attorney, Agent, or Firm* — Greenberg Traurig, LLP (57) ABSTRACT

When a device is determined to be capable of being of being paired with each of a plurality of appliances, a one of the plurality of appliances is automatically selected for an attempted pairing with the device. The one of the plurality of appliances is selected using priority information that has been associated with each of the plurality of appliances. Once the one of the plurality of appliances has been selected; the device is caused to automatically attempt to pair with the selected one of the plurality of appliances.

14 Claims, 5 Drawing Sheets

(56) References Cited

U.S. PATENT DOCUMENTS

| | | |
|---|---|---|
| 2009/0156123 A1 | 6/2009 | Kim |
| 2009/0168741 A1 | 7/2009 | Masuda |
| 2012/0014299 A1 | 1/2012 | Yoon et al. |
| 2012/0084446 A1* | 4/2012 | Iinuma ............... H04W 36/0079 709/227 |
| 2012/0297306 A1* | 11/2012 | Hassan ................. H04W 76/14 709/228 |
| 2013/0157573 A1* | 6/2013 | Aldaz ............... H04M 1/72412 455/41.2 |
| 2013/0260690 A1 | 10/2013 | Cha |
| 2014/0235167 A1* | 8/2014 | Jung ..................... H04W 76/15 455/41.2 |
| 2014/0259167 A1* | 9/2014 | Babu .................. H04L 63/1425 726/23 |
| 2015/0125014 A1 | 5/2015 | Howes |
| 2015/0249882 A1 | 9/2015 | Patil et al. |
| 2016/0050476 A1 | 2/2016 | Patil |

OTHER PUBLICATIONS

ISA/US, International Search Report and Written Opinion issued on PCT application No. US17/24032, dated Apr. 21, 2017, 11 pages.
EPO, extended European Search Report issued on European patent application No. 17779522.6-1221, dated Oct. 19, 2019, 3 pgs.

* cited by examiner

SYSTEM AND METHOD FOR PAIRING A HEARING DEVICE AND AN APPLIANCE

RELATED APPLICATION INFORMATION

This application claims the benefit of and is a continuation of U.S. application Ser. No. 15/091,714, filed on Apr. 6, 2016, the disclosure of which is incorporated herein by reference in its entirety.

BACKGROUND

Wireless headphones or cable earphones, which may have sensors, a microphone, a volume control knob, etc. (all referred to hereafter as "hearing devices"), are known to be pairable with an appliance, such as a TV, set top box, audio receiver, etc., (i.e., placed into a state in which a wireless connection is made between the two devices to thereby allow the two devices to communication via use of a similar protocol). However, when a hearing device is pairable to multiple devices and a user desires to switch a pairing from one appliance to a different appliance, the pairing process associated with this desired switch often results in pairing loss or latency.

SUMMARY

To solve this and other problems, the following generally describes a system and method that utilizes pairing priorities and/or pairing rules to facilitate a pairing between a hearing device and a one of multiple different appliances. While the system will include the hearing device and the multiple different appliances, the system may further include and use a smart device on which is installed a software application (referred to hereafter as an "app"). The app, which may be pre-installed in the smart device or which may be made available for download by a user, is particularly provided to allow a user to customize the operation of the hearing device. The inclusion of the smart phone and the app within the system will be advantageous in circumstances where the hearing device cannot itself support such an app, e.g., in circumstances where the hearing device has limited user input capabilities and/or is incapable of providing some or all of the services that are hereinafter described as being provided by the app.

More particularly, the described app provides a user interface, e.g., an audible interface and/or a graphical user interface (a "GUI"), that is intended to provide a user with a listing of one or more appliances located within an environment. Through use of the user interface, a user will be able to establish and/or edit the pairing priorities and/or pairing rules that are to be used to facilitate a pairing between a hearing device and a one of multiple different appliances within the environment. The user interface may also provide a mechanism by which a user may manually initiate a pairing process between the hearing device and an appliance, for example, by selecting an icon representative of the appliance that is provided via use of a GUI. Because the information provided by the user interface is intended to be environment specific, the information provided by the user interface may be automatically changed and/or updated as a user moves from one environment to another.

A better understanding of the objects, advantages, features, properties and relationships of the subject system and method will be obtained from the following detailed description and accompanying drawings which set forth illustrative embodiments which are indicative of the various ways in which the principles of the system and method may be employed.

BRIEF DESCRIPTION OF THE DRAWINGS

For a better understanding of the system and method described hereinafter, reference may be had to preferred embodiments shown in the following drawings in which.

DETAILED DESCRIPTION

Described hereinafter are exemplary systems and methods by which a hearing device, such as wireless headphones, can be automatically paired with a preferred appliance, such as a television or a stereo. The described systems and methods are particularly useful in circumstances where the hearing device is capable of being paired to two or more appliances within a given environment and/or in circumstances where a user of the hearing device moves from one environment to another. To facilitate such pairing, the described systems and methods use priority values and/or priority rules (hereinafter individually and collectively referred to as "priority information") which priority information may be stored within the hearing device and/or a smart device, such as a tablet or smart phone, that may be included as a component part of the system. In this manner, when a hearing device is capable of being paired with two or more appliances, one of the appliances is selected for pairing with the hearing device based upon the priority information that has been associated with the appliances.

Figure 1:
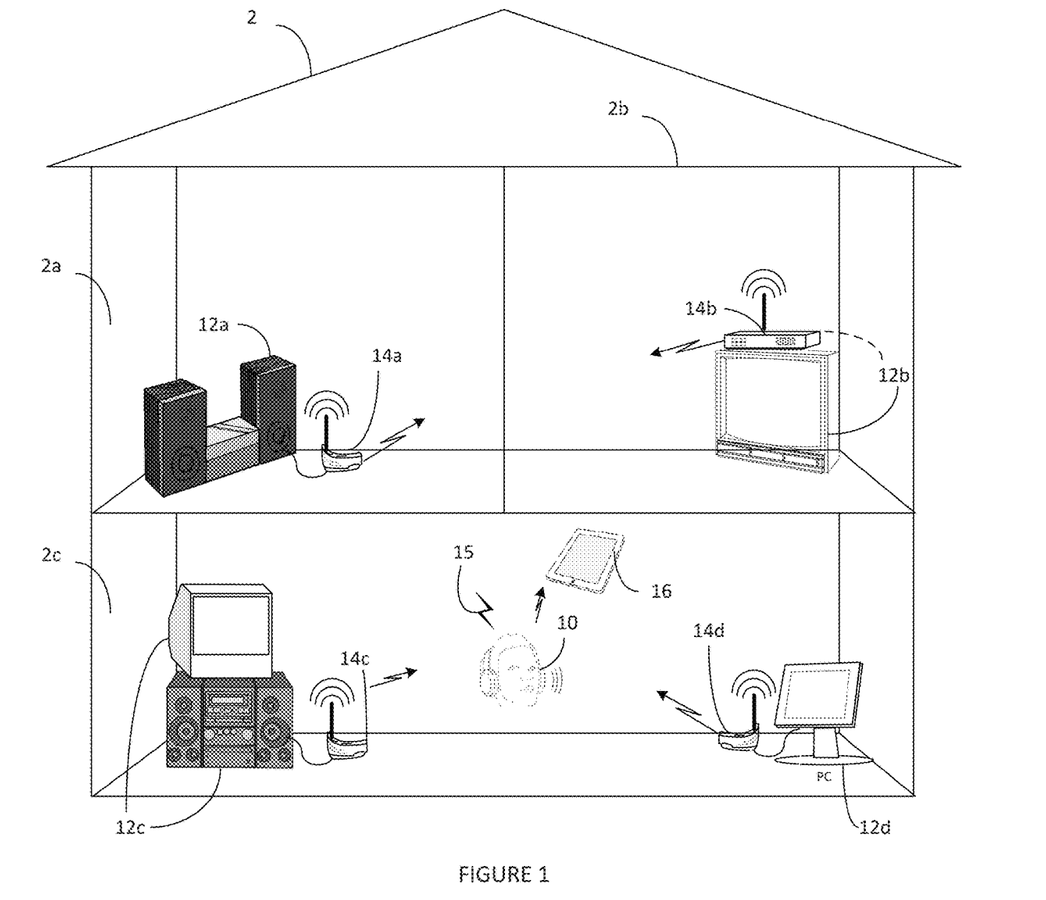
FIG. 1 illustrates an exemplary environment in which the subject system and method may be employed.

With reference to FIG. 1, an exemplary system is illustrated which includes a hearing device 10 and two or more appliances (two or more of appliances 12a-12d) that are located within an environment (such as a building 2, rooms 2a, 2b and 2c, etc.). As will be appreciated, an environment (and, accordingly, the appliances within an environment) is generally defined by the communicative range of the hearing device 10 and each of the appliances 12. Furthermore, while the illustrated system is shown as including devices such as a television, a computer, and audio systems, this is not intended to be limiting. Rather, appliances that may be paired with the headset 10 may include non-illustrated appliances such as VCRs, DVRs, DVD players, cable converter boxes, amplifiers, CD players, game consoles, home lighting devices, fans, HVAC systems, thermostats, personal computers, parametric sound systems, smart devices, such as cell phones, tablets, smart watches, smart clothing, activity trackers, and the like without limitation.

Within the system of FIG. 1, the hearing device 10 may operate as a stand-alone device and/or may operate in cooperation with a smart device 16 containing an app. When the hearing device 10 and a smart device 16 are used in the system, one or both of the smart device 16 and the hearing device 10 may function to provide to the other of the smart device 16 and the hearing device 10 a connection notification message whereupon the device receiving the notification message will function to provide a visual, vibrating motion, and/or audible message to a user, as appropriate for a given set of circumstances, to inform the user of the various appliances 12 that have been determined to be within pairing range of the hearing device 10. In some circumstances, the notification message can also be used to inform a user of the appliance with which the hearing device 10 is currently paired. Such notification messages can be caused to be sent when, for example, it is determined that the user has changed environments, it is sensed that the user has turned on (or otherwise starts to wear) the hearing device 10, etc. The information that is to be provided to the user may include one or more of an indication of a type for the appliance (e.g., that the appliance is a personal computer, TV, CD player, etc.) and an indication of a brand for the appliance (e.g., that the appliance is branded as "Sony," "Samsung," etc.). Once a user is provided with the information, the user will be able to interact with the user interface provided by the device to select an appliance for pairing with the hearing device 10, to update and/or edit the priority information for the appliance(s), change a pairing, and/or the like, again as appropriate for a given set of circumstances.

When an audible interface is to be provided, the device (e.g., hearing device 10 and/or smart device 16) would also be provisioned with appropriate speech generating capabilities (and speech recognition capabilities as needed). Using such capabilities, the device would use identifying information obtained from the appliances (and/or from another device) to inform the user of the appliances within the environment. Meanwhile, tactile notifications can be provided via use of a vibrating means, such as a vibration motor, which causes a device to vibrate on one or both sides. While visual and audible information may provide a user with more detailed information, e.g., the information may inform the user that hearing device 10 can be paired with (or is currently paired with) a "Sony" branded TV in the living room, it will be appreciated that less information will be capable of being conveyed via use of tactile notifications. Accordingly, the information that is to be conveyed via use of tactile notifications may simply serve to inform the user that the hearing device 10 is currently paired to an appliance on the left or right hand side of a device by vibrating the left side or right side of the device, respectively, for a predetermined period of time.

It will also be appreciated that, in circumstances where the hearing device 10 and/or the smart device 16 are, in turn, communicatively coupled with another device (either directly or indirectly via use of an intermediate device, such as a smart routing device), the appliance information may alternatively, or in addition to, be provided to that device for presentation to a user as appropriate given the capabilities of that device and as desired.

While not required, it is additionally contemplated that the hearing device 10 may further comprise a universal remote control app, which allows the hearing device 10 to communicate with a variety of appliances 12 that utilize different communication protocols, frequencies, technologies, etc., and the necessary hardware to enable transmission of commands to, and responses from (if needed), the appliances 12. Commands 15 from the hearing device 10 may be issued using infrared signal protocols and/or radio frequency protocols (e.g., Wi-Fi, RF4CE, Bluetooth, etc.). Commands sent by the hearing device 10 for controlling functional operations of one or more of the appliances 12 may also be issued indirectly to the one or more of the appliances 12 via an associated relay device 14a, 14b, 14c and 14d which may be responsive to a predetermined radio frequency format and each of which may be located in a different location than the hearing device 10. Thus, for example, the relay device 14a, located in environment 2a, may be provisioned by the app contained in a smart device 16 to perform a relay operation when a signal is detected from the hearing device 10 for intended receipt by the appliance 12a.

Figure 2:
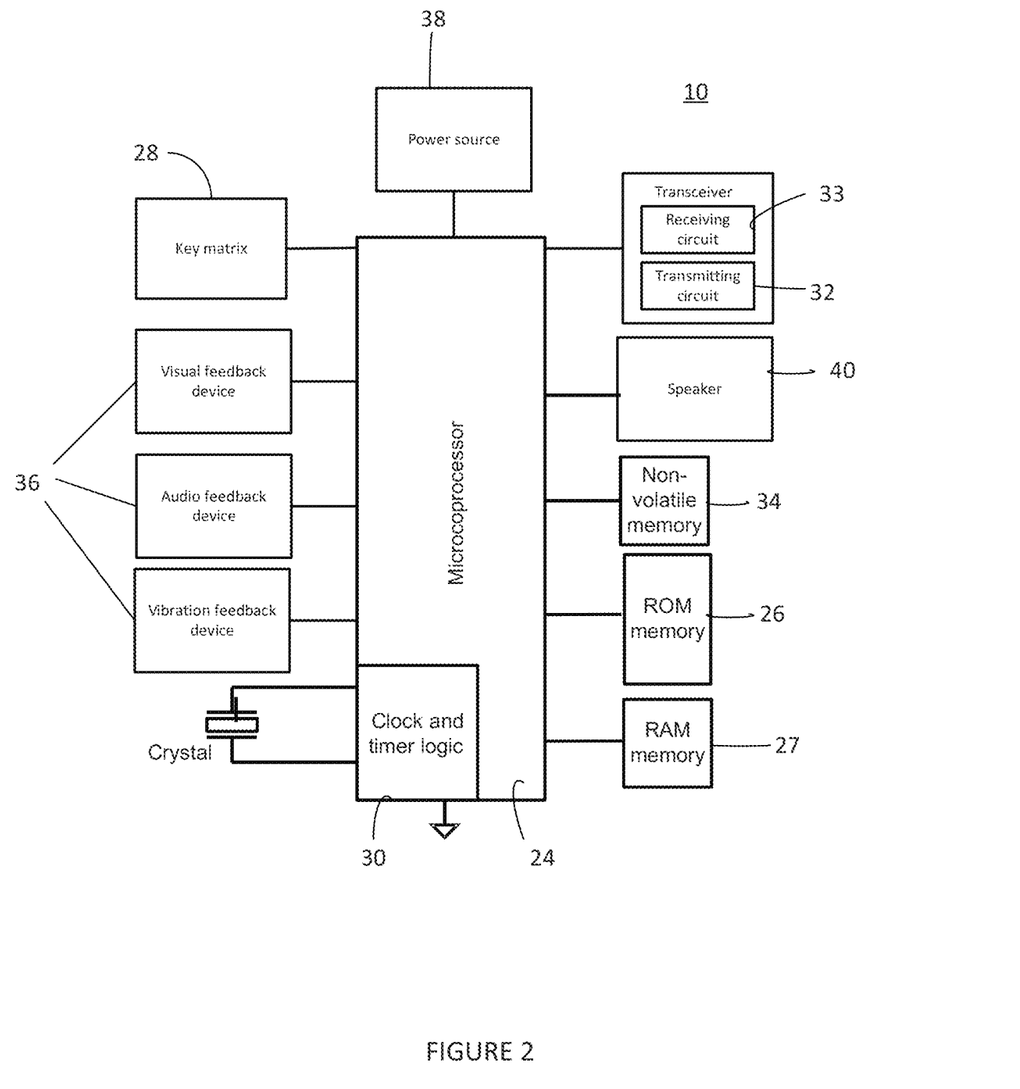
FIG. 2 illustrates a block diagram of components of an exemplary hearing device of the subject system.

For use in transmitting command codes to one or more of the appliances 12, the hearing device 10 of the exemplary system may include, as needed for a particular application and as illustrated in FIG. 2, a processor 24 coupled to a memory device (such as ROM memory 26, RAM memory 27, and a non-volatile memory 34), a key matrix 28 (e.g., physical buttons), an internal clock and timer 30, transmission circuit(s) 32, receiver circuit(s) 33, and/or transceiver circuit(s) (e.g., IR and/or RF), a means 36 to provide feedback to a user (e.g., LED, display, speaker, accelerometer, and/or the like), one or more speakers 40 and a power supply 38. As will be understood by those of skill in the art, the memory device 26, 27 or 34 may include executable instructions that are intended to be executed by the processor 24 to control the operation of the hearing device 10. In this manner, the processor 24 may be programmed to control the various electronic components within the hearing device 10, (e.g., to communicate with appliances, to cause the transmission of signals, etc.).

The non-volatile read/write memory 34, for example an EEPROM, battery-backed up RAM, Smart Card, memory stick, or the like, may be provided to store setup data and parameters as necessary. It is to be additionally understood that the memory devices may take the form of any type of readable media, such as, for example, ROM, RAM, SRAM, FLASH, EEPROM, Smart Card, memory stick, a chip, a hard disk, a magnetic disk, and/or an optical disk. Still further, it will be appreciated that some or all of the illustrated memory devices 26, 27, and 34 may be physically incorporated within the same IC chip as the microprocessor 24 (a so called "microcontroller") and, as such, they are shown separately in FIG. 2 only for the sake of clarity.

Figure 3:
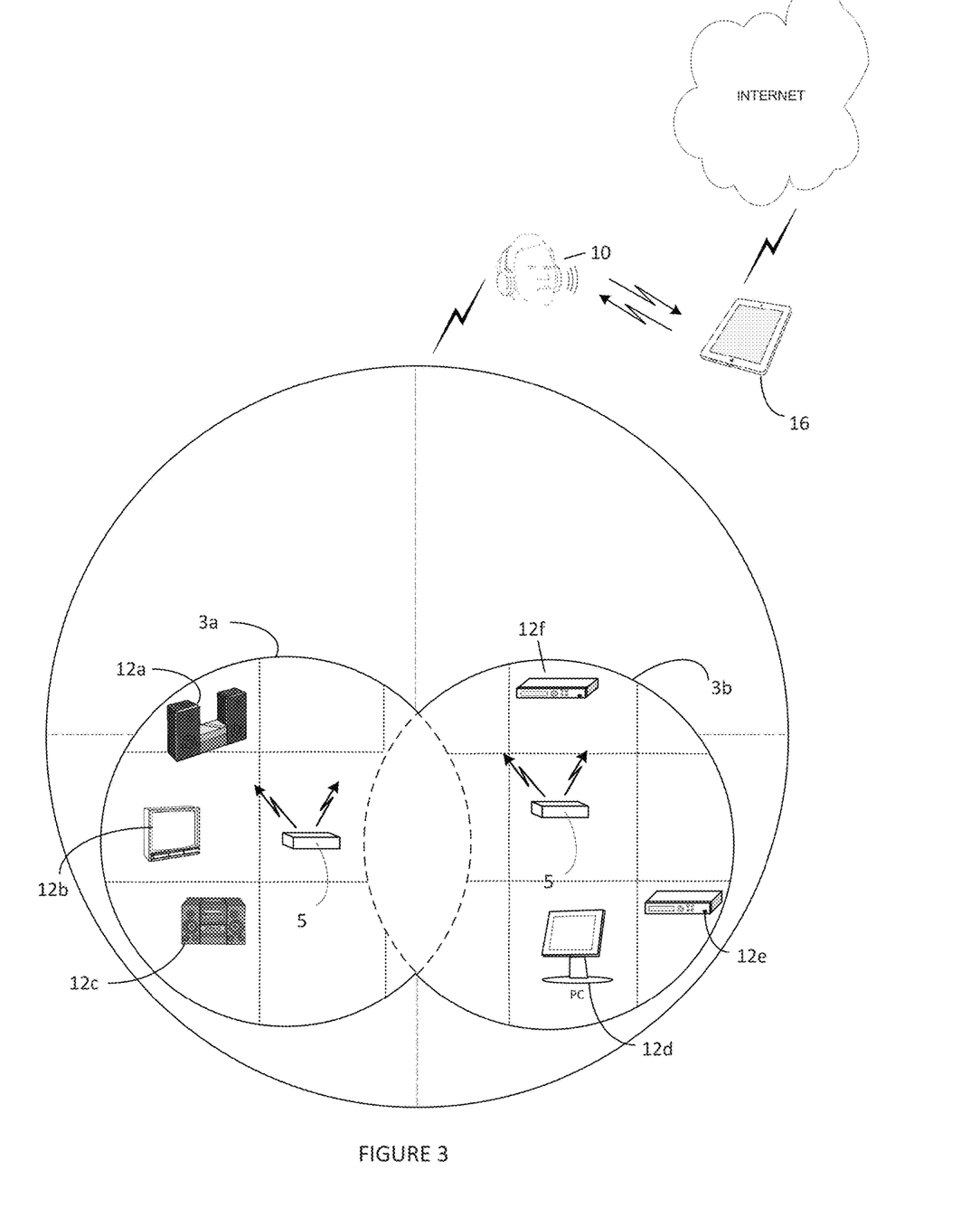
FIG. 3 illustrates an example by which a hearing device is caused to be paired with a one of multiple appliances within the environment.

FIG. 3 illustrates an exemplary system in which an intermediate adapter 5 is optionally provided to allow communications to be exchanged between the hearing device 10 (and/or smart device 16) and one or more of the appliances 12, e.g., appliances 12a, 12b and 12c located within environment 3a and appliances 12d, 12e and 12f located within environment 3b. The adapter 5 may also be used to facilitate communication exchanges amongst the appliances 12. To this end, intermediate adapter 5 comprises the necessary hardware and software to support such communication exchanges. For example, the intermediate adapter 5 may include a universal control engine operating in cooperation with a smart device app executed by smart device 16, which may be used to identify one or more of the appliances 12 and which may use identity information to configure the intermediate adapter (as well as the hearing device 10) as appropriate for communicating with an appliance 12. In addition, the identity information may be used to provision the intermediate adapter 5 (as well as the hearing device 10) with code sets in order for the device to control operations of one or more appliances 12. Examples of the foregoing universal control engine and associated technologies may be found in U.S. Pat. Nos. 8,558,676, 8,552,832, 8,812,629 and 8,659,400, all of which are of like assignee and all of which are incorporated herein by reference in their entirety.

While the foregoing describes using a universal control engine to obtain appliance identifying information, it will also be understood that device identifying information may be included within an appliance generated pairing signal, e.g., in a Bluetooth pairing signal, that is to be received by one or more of the hearing device 10, the smart device 16, and the adaptor 5. In addition, appliance identifying information may be manually provided by a user to one or more of the hearing device 10, the smart device 16 and the adaptor 5 as appropriate. For example, such information may be provided when a user is required to manually configure a remote control application of a device to control operations of a specific appliance 12. Still further, home appliances 12 may be identified by using a single-line HDMI-CEC (High Definition Multimedia Interface-Consumer Electronic Control) protocol, by using Extended Display Identification Data (EDID), and/or by using like data from a standard published by the Video Electronics Standards Association (VESA). In this regard and by way of example only, if an appliance 12 is coupled to an AV system via an HDMI-CEC cable, the AV system can automatically query the appliance 12 using an HDMI protocol to identify itself with the appliance 12 automatically responding to the query by sending the identifying information back across the HDMI-CEC bus.

Additional information pertaining to the set up and control of control devices and appliances—by which identifying information for an appliance may be obtained—may be found in U.S. Pat. Nos. 5,614,906, 6,225,938, 9,215,394, 9,219,874, and 4,623,887 all of which are of like assignee and all of which are incorporated herein by reference in their entirety.

It will also be appreciated that such appliance identifying information that is obtained by, captured by, or otherwise provided to one device within the system may, in turn, be provided to another device within the system.

Figure 4A:
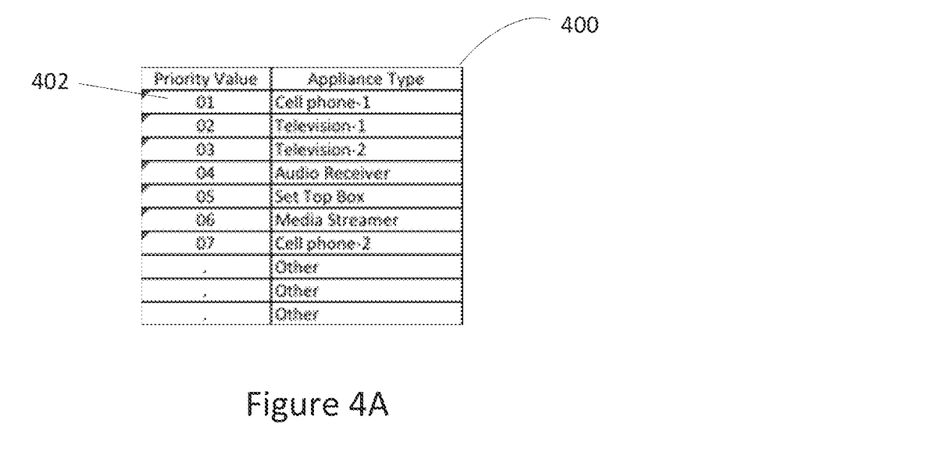
FIGS. 4A and 4B illustrate an exemplary priority rating system for use facilitating the pairing between the hearing device and the one of multiple appliances within the environment.
Figure 4B:
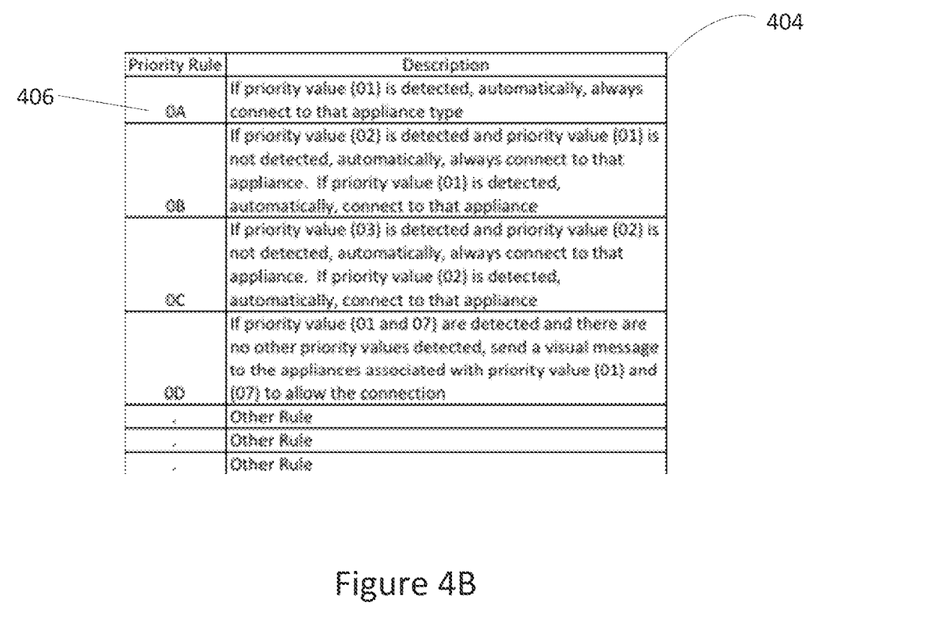

Once the hearing device 10 and/or the smart device 16 is made aware of the identity of the appliances 12 with which the hearing device 10 may be paired, the hearing device 10 and/or the smart device will use a priority value 402 and/or a priority rule 406 associated with identified appliances 12 to cause the hearing device 10 to be automatically paired with a one of the appliances 12 in accordance with the priority value 402 and/or priority rule 406.

More particularly, as shown in FIGS. 4A and 4B, communication prioritization tables 400 and/or 404 are provided to associate prioritization values 402 and/or prioritization rules 406 with the various appliances 12. This priority information may be stored within a memory of the hearing device 10, the intermediate adapter 5, and/or the smart device 16 for use as needed. Preferably, each of the various environments in which the hearing device 10 may be paired with an appliance 12 is provided with its own priority value table 400 and/or priority rule table 404, e.g., a priority value table 400 and a priority rule table 404 associated with environment 3a will be considered when hearing device 10 is present in environment 3a while a priority value table 400 and a priority rule table 404 associated with environment 3b will be considered when hearing device 10 is present in environment 3b. Thus, because plural priority tables 400 and plural priority rule tables 404 may be used, each of the plural priority tables 400 and plural priority rules tables is associated with information that serves to uniquely identify a one of the environments 3a and 3b in which the hearing device 10 may be located. By way of example only, such environment identifying information may be obtained by using signals received from intermediate devices 5 as described in U.S. Pat. Nos. 7,363,028, 8,942,726 and 9,026,141 all of which are of like assignee and all of which are incorporated herein by reference in their entirety, by use of GPS positioning signals, and the like without limitation.

It will be further understood that the environment identifying information may be provided directly to/obtained directly be the hearing device 10 and/or the smart device 16 as needed. When such information is provided to/obtained by the smart device 16, the smart device 16 can, in turn, provide such information to the hearing device 10 as again needed. In any case, when the location of hearing device 10 changes to a different environment (e.g., a user moves from the bedroom 3a to the living room 3b), the hearing device 10 or, alternatively, the app running on the smart device 16, may determine that hearing device 10 has changed location and that appliances 12d, 12e and 12f, contained within the new environment 3b, are now in range of hearing device 10. Once it has been determined that the user has changed locations from environment 3a to environment 3b, the priority value table 400 and/or the priority rule table 404 for appliances 12d, 12e, and 12f is selected for use in determining which of the appliances 12d, 12e, and 12f the hearing device 10 is to be paired. For example, when the hearing device 10 is moved into environment 3b, the hearing device 10 will then be caused (either by itself or under the direction of the smart device 16) to attempt to pair with an appliance 12 having the highest priority within the priority value table 400 and/or with an appliance 12 as dictated by the priority rule table 404.

While the use of multiple priority tables has been described, it will be understood that a single priority value table 400 and/or a single priority rule table 404 having priority values and rules, respectively, for all appliances 12 in all environments may be used for this same purpose.

For use in managing the one or more priority value tables 400 and/or the one or more priority rule tables 404, the hearing device 16 and/or the smart device 16 may comprise an app. The app, which provides the programming software and a user interface needed for this purpose, functions to provide a user with a listing of appliances 12, for example by make, model, and/or other identification information associated with the appliances 12, which appliances have been previously paired with (or which can be newly paired with if displaying such is desired) the hearing device 10. For example, the app may be adapted to display a graphical representation (e.g., an icon, widget, brand, etc.) of the appliances 12. As noted, when the hearing device 10 has been previously paired with an appliance 12 which is included within a priority and/or rules table, the priority and/or rules table will be consulted when determining which appliance the hearing device 10 should be paired with when the hearing device 10 is to be newly paired with an appliance, such as when the user changes environments or the hearing device 10 is turned on.

When an appliance 12 is first added to a one of the priority and/or rules table 10, identification information associated with the appliance 12 can be used to automatically assign a predetermined priority value and/or rule for that appliance. For example, when a user initially pairs a Bluetooth capable sound bar with the hearing device 10, a priority value 402 predetermined for the appliance type for the device, e.g., "sound bar," and/or for the brand of the device, e.g., "Sony," may be associated with the sound bar within the priority table 400. Priorities may also be automatically assigned based upon pairing order, e.g., a first paired appliance may be given a higher priority than a second paired appliance, either globally or within specific appliance categories, such as appliance type or brand. It will also be appreciated that a user may additionally or alternatively be requested to manually assign a priority to and/or create a rule for a newly added appliance via use of the user interface. Still further, a priority and/or a rule may be pre-assigned to appliances at a time of manufacture and such pre-assigned priority and/or rule may be conveyed to the app for use in the priority table and/or rule table as a part of the appliance identity process discussed above. To the extent conflicts in priorities and/or rules may occur as a result of the use of the described automated procedures, any such conflicts may be handled by using, for example, the aforementioned first in, higher priority and/or rule assignment steps discussed above. Alternatively, or in addition to, when there are multiple paired appliances 12 and one or more of the appliances 12 are set to the same pairing priority value or rule, a user may be provided with the ability to manually adjust the priority values and/or rules to set which appliance 12 connects to the hearing device 10 when both are in range.

Figure 5:
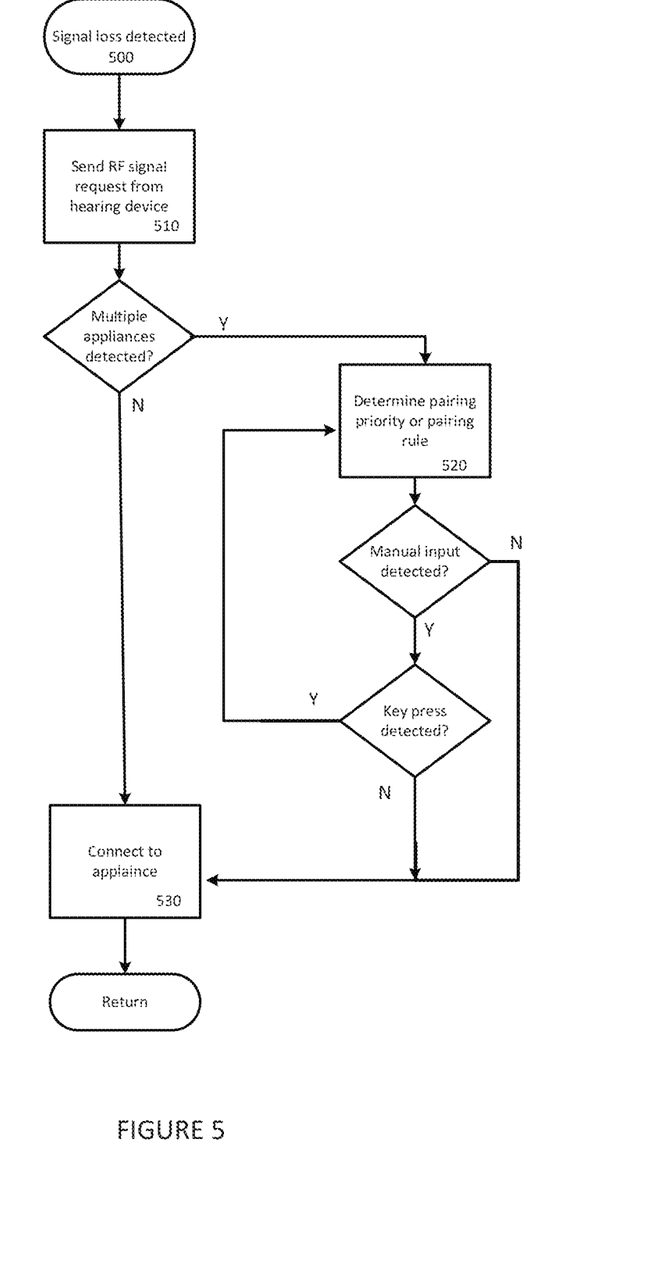
FIG. 5 illustrates a flow diagram for exemplary steps in a pairing process performed when a signal loss is detected.

Turning to FIG. 5, illustrated is an exemplary method for use in manually pairing the hearing device 10 with an appliance 12 in response to the hearing device 10 being moved from a first environment to a second environment. To this end, when it is detected 500 that the hearing device 10 has moved from environment 2a to environment 2c, for example, by the hearing device 10 detecting a reoccurring signal loss or detecting a complete signal loss within a predetermined period of time while in communication with appliance 12a, the hearing device 10 (or smart device 16) may be caused 510 to automatically broadcast one or more signals to the appliances 12, simultaneously or within a predetermined amount of time, to determine which appliances are within the current environment in which the hearing device 10 is located. If the system were configured for automatic pairing, one of the appliances would be selected for pairing considering the priority values 402 and/or the priority rules 406 as described above. However, in the case of manual selection, the hearing device may initiate a notification message to the app running on the smart device 16 which app would function to provide the user with a visual notification of the appliances with which the hearing device 10 may be paired, such as by displaying a list of appliances 12. The user may then select the desired appliance 12 from the list to complete the pairing process 530 with the hearing device 10. While not required, the appliances 12 can be ordered within the list considering the priority values 402 and/or priority rules 406 that have been established for the appliances within the given environment.

As further discussed above, it is also contemplated that the hearing device 10 may initiate an audible notification message, wherein the message comprises the type or brand of the appliances 12 and/or the location of the appliances 12, and the user can speak into a microphone and/or interact with user interface elements to select the appliance 12 with which the hearing device 10 is to be paired. It is additionally contemplated that the system may inform the user that an automatic pairing will occur within a given amount of time unless overridden by the user. For example, the user may be notified that TV-1 will be paired with the hearing device and such pairing will occur unless the user presses a hard key, speaks a command, or the like, to pair the hearing device 10 with another device, such as TV-2.

It is understood that unless otherwise stated to the contrary herein, one or more functions may be integrated in a single physical device or a software module in a software product, or one or more functions may be implemented in separate physical devices or software modules, without departing from the scope and spirit of the present invention.

The actual implementation is well within the routine skill of a programmer and system engineer, given the disclosure herein of the system attributes, functionality, and interrelationship of the various functional modules in the system. A person skilled in the art, applying ordinary skill can practice the present invention without undue experimentation.

While the subject system and method has been described with respect to one or more embodiments, it will be apparent to those skilled in the art that various modifications and improvements may be made to such described embodiments without departing from the scope and spirit of the invention hereinafter claimed. Accordingly, it is to be understood that the invention hereinafter claimed is not intended to be limited by the described embodiments.

All patents and applications for patent cited within this document are hereby incorporated by reference in their entirety.

What is claimed is:

1. A sink device, comprising:
   a processing device;
   a transceiver;
   at least one speaker; and
   a memory having stored instructions wherein the instructions, when executed by the processing device, cause the sink device to perform steps for pairing the sink device with a one of a first audio device having a first appliance identifying data and a second audio device having a second appliance identifying data, where each of the first audio device and the second audio device are adapted to provide audio data to the sink device via use of the transceiver and a common communications protocol for output via the at least one speaker, the steps comprising:
   receiving from the first audio device the first appliance identifying data and receiving from the second audio source device the second appliance identifying data;
   using the received first and second appliance identifying data to automatically associate a pairing priority level with each one of the first and second audio source devices;
   storing in the memory the priority pairing level that was automatically associated with each one of the first and second audio source devices; and
   in response the sink device detecting an incoming signal loss while paired to a third audio source device, automatically broadcasting a request signal, receiving from the first audio source device a first response signal having the first appliance identifying data and receiving from the second audio source device a second response signal having the second appliance identifying data, using the first and second appliance identifying data in the first and second response signals to read from the memory the priority pairing level that was previously, automatically associated with each of the first and second audio source devices, using at least the pairing priority level that was previously, automatically associated with each of the first and second audio source devices as read from memory to select the one of the first and second audio source devices for pairing, and automatically pairing with the selected one of the first and second audio source devices whereupon the transceiver will have a communicative data connection for receiving audio data only from the selected one of the first and second audio source devices.

2. The sink device as recited in claim 1, wherein the memory stores information that functions to cross-reference audio source devices with data that functions to identify an environment in which the sink device may be located and wherein the sink device determines the environment in which the sink device is located and then uses the determined environment in combination with the pairing priority level that was previously, automatically associated with each of the first and second audio source devices as read from memory to select the one of the first and second audio source devices for pairing.

3. The sink device as recited in claim 2, wherein the sink device receives a signal from an intermediate device uses the received signal from the intermediate to determine the environment in which the sink device is located.

4. The sink device as recited in claim 1, wherein the appliance identifying data is received directly by the sink device from each of the first and second audio source devices.

5. The sink device as recited in claim 1, wherein the sink device further comprises an input element and wherein the instructions, when executed by the processing device, further cause the sink device to provide to a user via the at least one speaker a listing of audio source devices and to receive input from the user via the input element to modify the pairing priority level that was automatically associated with at least one of the audio source devices within the listing.

6. A sink device, comprising:
   a processing device;
   a transceiver;
   at least one speaker; and
   a memory having stored instructions wherein the instructions, when executed by the processing device, cause the sink device to perform steps for pairing the sink device with a one of a first audio source device having a first appliance identifying data that functions to identify at least a device type or a brand for the first audio source device and a second audio source device having a second appliance identifying data that functions to identify at least a device type or a brand for the second audio source device, where each of the first and second audio source devices are adapted to provide audio data to the sink device via use of the transceiver and a common communications protocol for output via the at least one speaker, the steps comprising:
   receiving from the first audio device the first appliance identifying data and receiving from the second audio source device the second appliance identifying data;
   using the received first and second appliance identifying data to automatically associate a pairing priority level with each one of the first and second audio source devices;
   storing in the memory the priority pairing level that was automatically associated with each one of the first and second audio source devices; and
   in response to the sink device detecting an incoming signal loss while paired with a third audio source device, automatically broadcasting a request signal, receiving from the first audio source device a first response signal having the first appliance identifying data and receiving from the second audio source device a second response signal having the second appliance identifying data, using the first and second appliance identifying data in the first and second response signals to read from the memory the priority pairing level that was previously, automatically associated with each of the first and second audio source devices, using at least the pairing priority level that was previously, automatically associated with each of the first and second audio source devices as read from memory to select the one of the first and second audio source devices for pairing, and automatically pairing with the selected one of the first and second audio source devices whereupon the transceiver will have a communicative data connection for receiving audio data only from the selected one of the first and second audio source devices.

7. The sink device as recited in claim 6, wherein the memory stores information that functions to cross-reference audio source devices with data that functions to identify an environment in which the device may be located and wherein the device determines the environment in which the sink device is located and then uses the determined environment in combination with the pairing priority level that was previously, automatically associated with each of the first and second audio source devices as read from memory to select the one of the first and second audio source devices for pairing.

8. The sink device as recited in claim 7, wherein the sink device receives a signal from an intermediate device uses the received signal to determine the environment in which the sink device is located.

9. The sink device as recited in claim 6, wherein the first and second appliance identifying data is received directly by the sink device from each of the first and second audio source devices.

10. The sink device as recited in claim 6, wherein the sink device further comprises an input element and wherein the instructions, when executed by the processing device, further cause the sink device to provide to a user via the at least one speaker a listing of audio source devices and to receive input from the user via the input element to modify the pairing priority level that was automatically associated with at least one of the audio source devices within the listing.

11. A sink device, comprising:
   a processing device;
   a transceiver;
   at least one speaker; and
   a memory having stored instructions wherein the instructions, when executed by the processing device, cause the sink device to perform steps for pairing the sink device with a one of a first audio device having a first appliance type identifying data and a second audio device having a second appliance type identifying data, where each of the first audio device and the second audio device are adapted to provide audio data to the sink device via use of the transceiver and a common communications protocol for output via the at least one speaker, the steps comprising:
   in response the sink device detecting an incoming signal loss while communicating with a third audio source device, receiving from the first audio source device the first appliance identifying data; receiving from the second audio source device the second appliance identifying data, using the received first and second appliance identifying data to automatically associate a pairing priority level as read from the memory in which different priority levels are mapped to different appliance type identifying data with each of the first and second audio source devices; using at least the pairing priority level that was automatically associated with each of the first and second audio source devices to select the one of the first and second audio source devices for pairing, and automatically pairing with the selected one of the first and second audio source devices whereupon the transceiver will have a communicative data connection for receiving audio data only from the selected one of the first and second audio source devices.

12. The sink device as recited in claim 11, wherein the memory stores information that functions to cross-reference audio source devices with data that functions to identify an environment in which the sink device may be located and wherein the sink device determines the environment in which the sink device is located and then uses the determined environment in combination with the pairing priority level that was previously, automatically associated with each of the first and second audio source devices as read from memory to select the one of the first and second audio source devices for pairing.

13. The sink device as recited in claim 12, wherein the sink device receives a signal from an intermediate device and uses the received signal to determine the environment in which the sink device is located.

14. The sink device as recited in claim 11, wherein the appliance identifying data is received directly by the sink device from each of the first and second audio source devices.

* * * * *